(12) United States Patent
Ilg et al.

(10) Patent No.: US 12,553,703 B2
(45) Date of Patent: Feb. 17, 2026

(54) OPEN-LOOP DISTANCE ADJUSTMENT FOR A COORDINATE MEASURING MACHINE

(71) Applicant: HEXAGON TECHNOLOGY CENTER GMBH, Heerbrugg (CH)

(72) Inventors: Patrick Ilg, Wangen (DE); Pete Champ, Rickmansworth (GB); Patryk Wroclawski, Wangen (DE); Sascha Schiwy, Sennwald (CH); Kai Imhäuser, Lindau (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 125 days.

(21) Appl. No.: 18/523,614

(22) Filed: Nov. 29, 2023

(65) Prior Publication Data
US 2024/0200929 A1 Jun. 20, 2024

(30) Foreign Application Priority Data
Dec. 15, 2022 (EP) .................................... 22213891

(51) Int. Cl.
*G01B 11/00* (2006.01)
*G05D 3/12* (2006.01)

(52) U.S. Cl.
CPC ............. *G01B 11/005* (2013.01); *G05D 3/12* (2013.01)

(58) Field of Classification Search
CPC . G01B 11/005; G01B 11/2513; G01B 11/007; G01B 11/25; G01B 21/047;
(Continued)

(56) References Cited

U.S. PATENT DOCUMENTS

| 5,388,342 | A | 2/1995 | Garau et al. |
| 2015/0049186 | A1 | 2/2015 | Pettersson et al. |
| 2016/0377410 | A1* | 12/2016 | Becker ................. G01S 17/89 356/3.11 |
| 2017/0123053 | A1 | 5/2017 | Stigwall et al. |

FOREIGN PATENT DOCUMENTS

| DE | 43 25 347 A1 | 2/1994 |
| EP | 2 916 099 B1 | 9/2020 |

(Continued)

OTHER PUBLICATIONS

English translation of JP2004-093190, published Mar. 25, 2004. (Year: 2004).*

(Continued)

*Primary Examiner* — Christina A Riddle
(74) *Attorney, Agent, or Firm* — Maschoff Brennan (57) ABSTRACT

A method for controlling a distance between a non-contact measurement probe head of a CMM and a work piece during a measurement. The method comprises providing steering commands to steer the work piece and/or the probe head through a measuring path comprising measuring positions, performing at a measuring position a measuring step comprising providing distance adjustment steering commands to set the distance between the probe head and the work piece, projecting a primary measuring beam pattern onto the work piece, acquiring a secondary measuring beam pattern originating from an interaction of the primary measuring beam with the work piece, deriving surface information based on the secondary measuring beam pattern, deriving information regarding the distance between the probe head and the work piece, deriving a distance deviation based on a distance target the derived distance information, providing the distance deviation for a distance adjustment performed at a subsequent measuring position.

17 Claims, 7 Drawing Sheets

(58) Field of Classification Search
CPC ...... G01B 5/008; G01B 11/026; G01B 11/24; G01B 11/0608; G01B 11/2518; G01B 2210/58; G05D 3/12; F16C 29/02; G01D 11/02; G01D 5/268; G01S 17/48; G01S 7/4814; G01S 7/4816; G01S 7/4868; G05B 19/401; G05B 2219/37193; G05B 2219/37237; G05B 2219/37198; G05B 2219/50249; G05B 2219/50252; G05B 2219/50257; G06F 3/005; G06F 3/0304; Y02P 90/02; G01C 3/02; G06T 2207/30204; G06T 7/521; G06T 7/70; H01H 59/0009; H04N 23/56; B23Q 17/20; B23Q 17/2471; B23Q 3/15713
USPC ....................... 356/3–22, 614–624, 601–613
See application file for complete search history.

(56) References Cited

FOREIGN PATENT DOCUMENTS

| | | |
|---|---|---|
| EP | 2 899 501 B1 | 8/2022 |
| JP | 2004-093190 A | 3/2004 |

OTHER PUBLICATIONS

Extended European Search Report dated Jun. 12, 2023 as received in Application No. 22213891.9.

* cited by examiner

OPEN-LOOP DISTANCE ADJUSTMENT FOR A COORDINATE MEASURING MACHINE

FIELD

The present disclosure relates to a method of aiding the steering a non-contact, in particular optical, probe head of a coordinate measuring machine (CMM). The method comprises providing distance adjustment steering commands in order to maintain a distance between the probe head and the work piece. The present disclosure further relates to an open loop distance adjustment controller and a CMM comprising the said controller. Furthermore, the present disclosure relates to a computer program product for the implementation of the CMM controlling method.

BACKGROUND

A CMM is a machine configured to measure the 3D coordinates of certain points, in particular the whole surface topography, of a work piece. Surface in the sense of the present disclosure might mean a 2D exterior of the work piece, but can equally mean a surface region, i.e. a region of finite thickness. For brevity and transparency reasons from here on surface will be used as a 2D surface, the specific features of measuring a surface region may be applied accordingly.

CMMs are important in various industries e.g. in production measurement, quality control, or reverse engineering. They are utilized e.g. to determine deviations of the geometry of manufactured products from a design model, in particular to determine whether the deviations are within the manufacturing tolerance. Such measurements are typically carried out automatically or semi-automatically based on a computer generated or operator selected measuring path, wherein such measuring path is provided with respect to a design model.

Another application of a CMM gaining more prominence is the reverse engineering of an object. In such cases no design model exists, but an operator commands the 3D movement of the probe head by manual steering commands utilizing e.g. a jog box/joystick. Alternatively, the operator may directly steer a handheld sensor.

Typically a CMM has a main structure, a probing system, a data collection and data processing system.

The main structure usually comprise a set of actuators responsible for positioning the probing system. One widespread example is a 3-axis system. E.g. DE 43 25 347 discloses such a CMM system. By way of example the main structure includes a basis with a measuring table and a movable frame. The work pieces might be positioned or mounted on the measuring table. The movable frame is mounted on the basis such that it can be moved along a first axis. The frame comprises an arm mounted such that is can be moved along a second axis perpendicular to the first axis. The probing system comprises the probe head and mounted on the arm such that it can be moved along a third axis, which is perpendicular to the first and second axes. Such a construction enables the steering of the probe head in all three dimensions allowing to measure the relevant 3D coordinates of an object. Contemporary 3-axis systems often comprise further components, e.g. stacked rotary tables, to provide 5 degrees of freedom regarding the relative pose of the probe head and work piece.

Another typical embodiment of the CMM is the articulated arm coordinate measuring machine (AACMM). An AACMM comprises a stationary base and an arm with multiple arm segments connected by articulations. The articulations provide movability to a movable end of the arm opposed to the base. A probe head can be attached to the movable end. Due to its design principles an AACMM is less accurate than the above mentioned 3- or 5-axis system, however it offers higher flexibility. E.g. EP 2 916 099 B1 discloses such an AACMM instrument.

The probing system of the CMM might be based on contact or non-contact techniques. In the first case a mechanical probe, typically realized as a stylus, achieves direct mechanical contact with the work piece. The probe is then guided through a given measuring path, while the endpoint coordinates of the probe are derived from sensor readings regarding the state of the CMM. Non-contact techniques are based on projecting a primary measuring beam on the work piece and registering a secondary beam emanating from the surface region. One advantage of non-contact techniques is that a damage to the work piece is less likely due to the lack of mechanical contact. Furthermore, non-contact methods allow a parallel acquisition of an extended area, unlike to the stylus-based methods where only the coordinates of a single point are registered.

To obtain high quality data the CMM measurement should be performed under steady-state measurement conditions. For contact probes this might be provided e.g. by keeping the contact and/or the friction force between the stylus and the work piece within a certain range. Such simple feedback methods are not available for automatically guiding a non-contact probe. This problem is particularly aggravated in the case of a manual measurement of an unknown work piece, since in this case it is not even possible to provide a sufficiently good approximation path based on a digital model or previous measurement data.

To achieve steady-state measurement conditions the operator is required to control the probe-head in translational and rotational dimensions. Providing a 3D measurement path via manual control requires non-natural user gestures, e.g., the use of a first joystick for lateral movements and a second joystick for vertical movements. Therefore, it is tedious and error-prone.

Reducing the manual measuring path generation to 2D by an automatic adjustment of the distance is known from state of the art. Dedicated distance adjustment sensors attached to the probe head e.g. through the lens lasers or ultra-sound sensors might provide further distance data. These methods, however, are based on the evaluation of single, possibly non-representative, point.

A distance tracking based on a coarse model from range imaging cameras is also known in the prior art, e.g. EP 2 899 501 B1 discloses such a system. However, especially for work pieces with complex geometry the distance observed by the camera might not correspond to the actual probe head-work piece distance. Furthermore, for an existing system installing an external component and integrating it into the control loop is not straightforward. Measurement methods based on coarse pre-models are not only slow and cumbersome, but also unresponsive to unexpected features on the work piece, i.e. region of interest not observed in the coarse pre-model.

SUMMARY

In view of the above circumstances, the object of the present disclosure is to provide a measurement method for a non-contact probe head of a coordinate measuring machine with improved accuracy, robustness and time efficiency, in particular during a measurement of an unknown work piece.

Utilizing the probe head itself in real time has merits, as the CMM is configured to provide geometry information from the work piece. Thus, combining the data provided by the probe head with the sensor readings regarding the state of the components of the CMM automatically deliver the distance of the probe head from the work piece. The full scale data processing is however, as of now, too slow to provide efficient feedback for the distance keeping loop. Fast scanning methods based on continuous scanning along a measuring path, in particular based on triangulation measurements, benefit especially from such control process.

The present disclosure relates to a method for automatically controlling a distance between a non-contact measurement probe head of a CMM and a work piece during a measurement process.

The method comprises the steps of 1.) providing nominal steering commands regarding a lateral movement of the probe head relative to the work piece, the nominal steering commands are configured to provide steering of the work piece and/or the probe head through a measuring path comprising a plurality of measuring positions, 2.) providing probe distance target data regarding a target distance between the probe head and the work piece, 3.) performing at a first measuring position a first measuring step, wherein the first measuring step comprises a.) providing first distance adjustment steering commands configured to provide setting of the distance between the probe head and the work piece, b.) projecting a primary measuring beam pattern onto the work piece, wherein the primary measuring beam pattern provides a plurality of measurement points, c.) acquiring a secondary measuring beam pattern, wherein the secondary measuring beam pattern originates from an interaction of the primary measuring beam with the work piece, d.) deriving surface information based on the acquired secondary measuring beam pattern, e.) deriving first probe distance information regarding the distance between the probe head and the work piece based on the acquired secondary measuring beam pattern, f.) deriving a first probe distance deviation based on the probe distance target data and the first probe distance information, g.) providing the first probe distance deviation to be processed in a step of providing second distance adjustment steering commands for performing a second measuring step at a second measuring position. It is self-explanatory for the person skilled in the art that the utilization of numerals and letters does not represent a sequence of performing the said steps, but rather a listing of the steps to be carried out in a sensible order. Variations in executing the steps of the various embodiments of the method are within the sense of the present disclosure.

Nominal steering commands might be computer generated commands regarding a pre-defined path relative to the surface of the work piece. Nominal steering commands might also be operator steering commands regarding an actual lateral movement relative to the work piece. The nominal steering commands may further comprise distance adjustment or rotation commands depending on measurement task. The present disclosure is not limited to pre-generated measurement paths but can be equally applied if the measurement path is generated as a result of operator commands or updated as a result of a computer command, in particular a collision avoidance command.

Measuring positions in the sense of the present disclosure are positions comprised by the measurement path, wherein a measuring step is performed. Measuring positions might be discrete or essentially continuous. The present disclosure is not limited to a specific distribution of measuring positions in the measurement path.

The first measuring step is a normal measuring step and not a pre-measurement or calibration step in the sense that full scale surface information is provided similarly to any subsequent measuring step. A pre-measurement or a justification step providing probe distance deviation to be processed in a step of providing first distance adjustment steering commands might be precedent to the first measuring step. The present disclosure, however, can be applied without such pre-measurement or justification steps. The surface information obtained in the first measuring step might be discarded.

The first distance adjustment steering commands might be provided based on a distance initialization value and/or an estimate provided by an operator or by manual steering. The first distance adjustment steering commands might be provided based on a pre-measurement or justification step. The first distance adjustment steering commands might be provided based on an automatic routine. The present disclosure is applicable in combination with any reasonable realization of the first distance adjustment steering commands, i.e. wherein the set distance between the probe head and the work piece enables the performing of a measuring step.

The primary measuring beam pattern might be projected onto the work piece as the whole pattern, in a single step. The primary measuring beam pattern might be projected by scanning with a single point, a plurality of single points, a continuous pattern or a sequence of patterns on the surface of the work piece. The primary measuring beam might be a light beam, in particular a laser beam. The primary measuring beam, however, might also be an electron, an ion, a sonic, an X-ray, or a microwave beam. The primary measuring beam can be any suitable combination or alternative of the here presented list.

The interaction of the primary measuring beam with the work piece might be reflection, in particular specular reflection. The interaction might be scattering, inelastic scattering, the interaction might be a generation of a secondary beam, in particular by fluorescence. The interaction might provide depth information regarding the origin of the secondary measuring beam within the work piece.

Surface information in the sense of the present disclosure might be coordinate information regarding certain features, surface information might be surface topography. Surface information might contain color information or, in particular in combination with fluorescence based methods, object density or chemical information. The person skilled in the art could combine the above listed types of surface information with each other or with similar alternatives.

The probe distance target data might represent an optimal distance for the probe head to the target. The optimal distance might be based on a lateral and/or depth resolution of the CMM. The optimal distance might provide an optimal field of view or secondary measuring beam intensity. Instead of an exact optimal distance the probe distance target data might be a range, wherein the range provides adequate measurement conditions for the CMM. The skilled person could realize the present disclosure in any of the above listed or suitable alternative way.

The first probe distance information might be based on a reduced dataset from the acquired secondary measuring beam pattern. In particular the reduced dataset might be a cropped part of the acquired secondary measuring beam pattern. The reduced dataset might have lower resolution or simplified intensity information. The first probe distance information might be a weighted pixel value representing the centroid of the acquired secondary measuring beam pattern. The first probe distance information might represent the envelope of the acquired secondary measuring beam pattern, i.e. the min-max values. The utilization of the reduced dataset is beneficial as it allows a faster data processing, i.e. a faster operation of the steering loop. The present disclosure is, however, not limited to the processing of a reduced dataset and might be carried out on the basis of the complete acquired secondary measuring beam pattern.

The first probe distance information might be a distance value derived from at least a portion of the acquired secondary measuring beam pattern and the probe distance target data might be an exact target distance or a target distance range. The first probe distance deviation might be a difference of the target distance and the derived distance value. For a target distance range the first probe distance deviation might be zero if the derived distance value falls within the range.

The first probe distance information might be pixel information representing at least a portion of the acquired secondary measuring beam pattern, in particular a mean or a median pixel of the acquired secondary measuring beam pattern, and the probe distance target data is a target pixel value or target pixel range. The first probe distance deviation might be a difference of the target pixel range and the mean pixel value. The first probe distance deviation might be calculated differently, in particular when the conversion of the pixel values to probe head-work piece distance follow a non-linear function. For a pixel range the first probe distance deviation might be zero if the mean falls within the range. The present disclosure is not limited to any specific representation of the first probe distance information, probe distance target or the first probe distance deviation.

To improve the evaluation a look up table might be used to derive the first probe distance information and/or the first probe distance deviation. I.e. the corresponding distance value and or distance deviation are derived utilizing a table provided off-line. This is especially beneficial when the conversion of the pixel values to probe head-work piece distance follow a non-linear function. Such look up tables, while beneficial, are not compulsory pre-requisites of the utilization of the present disclosure.

In some embodiments the method further comprises a second measuring step performed at a second measuring position. The second measuring step comprises 1.) processing the first probe distance deviation, 2.) providing the second distance adjustment steering commands configured to provide setting of the distance between the probe head and the work piece, wherein the second distance adjustment steering commands are based on the first probe distance deviation, 3.) adjusting the distance between the probe head and the work piece based on the second distance adjustment steering commands, 4.) projecting the primary measuring beam pattern onto the work piece, 5.) acquiring the secondary measuring beam pattern, 6.) deriving the surface information based on the acquired secondary measuring beam pattern.

The second measuring position might be the immediately subsequent to the first measuring position. Measuring positions analogous to the first measuring position might follow the first measuring position. Measuring positions without deriving the probe distance information and/or the probe distance deviation might follow the first measuring position. It is also self-evident that the step of providing second distance adjustment steering commands might receive a plurality of inputs similar to the described first probe distance deviations of further inputs other than the first probe distance deviation.

It is clear to the person skilled in the art, that the second measuring step is substantially similar to the first measuring step. The second measuring step nevertheless might comprise an appropriate adaptation based on e.g. the state of the work piece. By way of example the intensity of the primary measuring beam pattern might be reduced for strongly reflecting surface. Such adjustments of the measurement method are within the gist of the present disclosure.

In some embodiments the second measuring step further comprises 1.) deriving second probe distance information based on the acquired secondary measuring beam pattern, 2.) deriving a second probe distance deviation based on the probe distance target data and the second probe distance information, 3.) providing the second probe distance deviation to be processed in a step of providing third distance adjustment steering commands for performing a third measuring step at a third measuring position. It is clear to the person skilled in the art, that the second probe distance deviation is utilized in the provision of distance adjustment commands at a subsequent position. This setup is especially beneficial since it allows a time efficient, continuous measurement process, wherein the probe head is guided continuously, in particular at a constant speed, over the work piece. Such a continuous, single step process provides clear time efficiency benefits over a stepwise process comprising two stage measuring steps, e.g. pre-measurement for distance determination followed by a precise measurement, at the cost of an eventual slight compromise in the measurement accuracy. Similarly the "on the flight" type adjustment represent at most a slight reduction of the measurement speed, if any, while improving the measurement quality by providing a probe head-work piece distance at the proximity of the intended value.

The second probe distance information and the second probe distance deviation are substantially similar to the first probe distance information and the first probe distance deviation and the features of the first probe distance information and the first probe distance deviation might be applied accordingly.

In some embodiment the method further comprises the step of performing at the third measuring position the third measuring step. The third measuring step comprises 1.) processing the second probe distance deviation and/or the first probe distance deviation and/or one or more additional precedent probe distance deviations derived at additional precedent measuring positions, 2.) providing the third distance adjustment steering commands configured to provide setting of the distance between the probe head and the work piece, wherein the third distance adjustment steering commands are based on a.) the second probe distance deviation, and/or b.) the first probe distance deviation, and/or c.) the one or more additional precedent probe distance deviations, 4.) adjusting the distance between the probe head and the work piece based on the third distance adjustment steering commands, 5.) projecting the primary measuring beam pattern onto the work piece, 6.) acquiring the secondary measuring beam pattern, 7.) deriving the surface information based on the acquired secondary measuring beam pattern, 8.) deriving third probe distance information based on the acquired secondary measuring beam pattern, 9.) deriving a third probe distance deviation based on the probe distance target data and the third probe distance information, 10.) providing the third probe distance deviation to be processed in a step of providing further distance adjustment steering commands for performing a further measuring step at a further measuring position.

The further measuring steps at further measuring positions are substantially similar to the above described third measuring step. The additional precedent probe distance deviations are substantially similar to the third probe distance deviation. The above described third measuring step represents a generic step, i.e. receiving probe distance deviations from precedent measuring steps to provide distance adjustment steering commands and providing the probe distance deviation for subsequent measuring steps. Despite the advantages of a continuous distance adjustments further types of generic measuring steps without adjusting the distance between the probe head and the work piece and/or without providing the probe distance deviation for subsequent measuring steps are possible.

In some embodiments the third distance adjustment steering commands are based on one additional precedent probe distance deviation, in particular on the additional precedent probe distance deviation derived at an immediately precedent additional measuring position. In alternative embodiments the third distance adjustment steering commands are based on a plurality of precedent probe distance deviations, in particular a weighted average of them. These alternative embodiments are advantageous by reducing an eventual swinging of the control loop. Furthermore it is clear for the person skilled in the art that utilizing an immediately precedent probe distance deviation in providing the third distance adjustment steering commands is not compulsory. On the contrary applying a filter, in particular a filter reducing the outliers, and with that a delay might be advantageous, in particular in reducing the above mentioned swinging.

In some embodiments the nominal steering commands are at least partly based on actual manual steering commands from an operator, in particular commands provided by utilizing a joystick or a jogbox. This is especially beneficial since manual steering commands enable the guiding of the probe head without approximate design data. This is typical during the reverse engineering of a part. An embodiment of the present disclosure can be foreseen as such that the operator provides guidance instructions to the probe head by the jogbox. The distance adjustment commands from the operator, if any provided, are ignored and are instead provided by a controller of the CMM configured to execute steps of the method. In particular the jogbox might comprise a separate input field for manual distance adjustment commands. The jogbox might be configured to switch on and off the functionality of automatically controlling a distance and/or its options.

A manual scan of a work piece without a digital model might be executed according to the following workflow 1.) optionally creating a coarse pre-model of the sample, e.g. by range imaging cameras installed in the frame, 2.) performing an overview measurement, wherein the nominal steering commands are provided manually by an operator and the distance adjustment commands are automatically provided by the controller of the CMM, 3.) optionally deriving areas of low and high detail degrees (e.g. low detail degree: plain planes; high detail degree: bore holes, edges) on the basis of the overview measurement, 4.) optionally performing detailed elaboration measurements on the areas of high detail degree, and 5.) optionally switching to tactile sensor e.g. for identifying bore hole diameter. Alternatively, the areas of high detail degrees might be automatically identified during the overview measurement, and the controller automatically switches to a high resolution mode, e.g. by reducing the lateral movement speed of the probe head and/or increasing the resolution/sampling of the measuring path.

Fast sampling of unknown work pieces with high accuracy is a key step for manufacturing copies of existing mechanical parts, for which technical (CAD) drawings may not be available. By making spare parts efficiently available, the present disclosure may contribute to prolonged product lifetime of mechanical machines, reduce necessity of storing expanded stocks of often unused spare parts and hence contributing to the establishment of circular economies.

In some embodiments the nominal steering commands are automatically generated based on a pre-defined measuring path. The pre-defined measuring path might be automatically generated, in particular based on a previous measurement task, might be selectable from a set of pre-defined measuring paths or might be generated by an operator utilizing a computing unit communicatively coupled to the CMM.

In some embodiments a design data regarding the work piece is provided. The design data might be a nominal CAD or equivalent alternative data. The design data might be based on a measurement of a work piece within the nominal tolerances. In such embodiments the measuring path is generated with respect to the design data. The distance adjustments steering commands are further based on the measuring path and the design data.

In some specific embodiments the design data is coordinate information from a previous measurement process, in particular obtained with an alternative sensor, such as an overhead camera. The previous measurement process might be performed on the same work piece. Alternatively, the previous measurement process might be performed on an equivalent work piece.

The present disclosure also relates to a controller of a CMM. The CMM comprises probe head having an emitter unit configured to project a primary measuring beam pattern onto a work piece, wherein the primary measuring beam pattern providing a plurality of measurement points, and a receiver unit configured to acquire a secondary measuring beam pattern. The secondary measuring beam pattern originating from an interaction of the primary measuring beam with the work piece. The here described probe head is a functional unit. The emitter and the receiver unit might be physically integrated to a compact probe head. The emitter and receiver unit might be physically separate. The emitter unit might comprise a projection and/or beam deflection system comprising distributed elements. The present disclosure is not limited to a specific realization of the probe head, but can be applied with a wide variety of appropriate probe heads.

The CMM comprise a first set of actuators configured to execute nominal steering commands regarding a lateral movement of the work piece relative to the probe head. The nominal steering commands are configured to provide steering of the work piece and/or the probe head through a measuring path comprising a plurality of measuring positions. The first set of actuators might provide translation and/or rotation and/or tilt movement for the probe head. The first set of actuators might provide translation and/or rotation and/or tilt movement for the work piece. Movement actions comprising coordinated movements of the work piece and the probe head are also within the meaning of the present disclosure. The first set of actuators is a functional definition and the specific components taking the role of the first set of actuators might provide further functionalities. The present disclosure is not limited to a specific realization of the first set of actuators.

The CMM comprises a second set of actuators configured to execute distance adjustment steering commands to set the distance between the probe head and the work piece. The second set of actuators might be a specific actuator to set a distance of the probe head to the work piece, e.g. the z-axis of a 3-axis CMM. The second set of actuators might also be a set of actuators utilized in a coordinated manner to set a distance of the probe head to the work piece. The first set of actuators and the second set of actuators might comprise one or more common physical components utilized in a different manner. For complex work pieces a physical component may be utilized as an actuator of the second set of actuators for only at a given part of the measuring path.

The controller comprises an evaluation functionality configured to derive surface information based on the acquired secondary measuring beam pattern. Surface information might be coordinate information, in particular surface topography, or surface quality, in particular roughness. Surface information might be color information or a density of specific objects. The present disclosure is not limited to obtain a specific type of surface information. The evaluation might be carried out by a computing unit physically separated from the CMM, in particular a remote computing unit. Such computing units are comprised by the controller in the sense of the present disclosure.

The controller further configured to 1.) provide probe distance target data regarding a target distance between the probe head and the work piece, 2.) derive first probe distance information regarding the distance between the probe head and the work piece based on the acquired secondary measuring beam pattern, 3.) derive a first probe distance deviation based on the probe distance target data and the first probe distance information, and 4.) provide the first probe distance deviation to be processed in a step of providing second distance adjustment steering commands for performing a second measuring step at a second measuring position. For practical purposes it is advantageous when the above functionalities are provided by an internal control loop of the CMM since it would lead to a faster reaction of the control loop. The present disclosure, however, could be realized even when an external computing unit provides the above functionalities. The latter approach is especially advantageous that it allows a retrofitting of an existing CMM without extensive modifications.

One envisaged embodiment of the present disclosure is, wherein the acquired secondary measuring beam pattern is evaluated by first algorithm to provide the surface information and a second algorithm provides the probe distance deviation. This embodiment is advantageous while the second algorithm could be substantially faster, in particular by utilizing a reduced dataset. The present disclosure is, however, not limited to this embodiment and could be realized by deriving the probe distance deviation information on the basis of the derived surface information. Alternative embodiments of deriving the probe distance deviation information are also within the sense of the present disclosure.

In some embodiments the first actuator is further configured to provide a rotational degree of freedom. The controller is further configured to derive a work piece local surface normal based on a plurality of preceding probe distance information. The controller is further configured to provide beam rotation steering commands for the first set of actuators based on the work piece local surface normal. The beam rotation steering commands are configured to provide aligning of the primary measuring beam to the work piece local surface normal at a subsequent measuring position. These embodiments are especially advantageous as not only the probe head-work piece distance, but the probe head-work piece angle is kept at least in the proximity of a given value, thereby providing steady state measuring conditions for work pieces with complex shapes.

In some embodiments controller further comprises an anomaly detection functionality. The anomaly detection functionality comprises the steps of 1.) detecting an anomaly on the work piece based on one or more successive probe distance deviations, in particular wherein the one or more successive probe distance deviations exceed a threshold level, 2.) updating the nominal steering commands based on the detected anomaly in order to reduce a lateral movement velocity of the probe head. Said anomaly detection functionality can be on one hand be seen as a crash avoidance system, in particular in the case of a manual steering of the probe head. The anomaly detection functionality might further provide a feedback to the operator, the feedback might have different warning levels. On the other hand the anomaly can further provide a region of interest, i.e. a region which shall be investigated in more detail. E.g. the work piece might have an add-on component, a drilling hole or a large scratch. In some specific embodiments the controller is further configured to automatically update the measuring path by generating further measuring positions along the measuring path in order to derive more surface information based on the detected anomaly.

The present disclosure also relates to a CMM equipped with an embodiment of the controller. The CMM further comprises a probe head, a first set of actuators, and a second set of actuators. The probe head has an emitter unit configured to project a primary measuring beam pattern onto a work piece to provide a plurality of measurement points, and a receiver unit configured to acquire a secondary measuring beam pattern originating from an interaction of the primary measuring beam with the work piece. The first set of actuators configured to execute nominal steering commands regarding a lateral movement of the work piece relative to the probe head. The nominal steering commands are configured to provide steering of the work piece and/or the probe head through a measuring path comprising a plurality of measuring positions. The second set of actuators are configured to execute distance adjustment steering commands to set the distance between the probe head and the work piece.

In some embodiments of the CMM the primary measuring beam is a laser beam, in particular wherein the primary measuring beam pattern comprises one continuous laser light section. The interaction of the primary measuring beam with the work piece is reflection, in particular diffuse reflection, of the laser beam, and the secondary measuring beam pattern is a reflected laser beam pattern. The evaluation functionality utilizes laser triangulation to derive coordinate information, i.e. observing the reflected laser light from an offset position and deriving coordinate information based on the shape of laser light section. Laser triangulation of a section is a well-known technique for CMM measurements, and the present disclosure is especially suitable to be used in combination with laser triangulation. The present disclosure is however not limited to the case of laser triangulation and might be applied to any suitable primary measuring beam. E.g. the present disclosure might utilized in combination with confocal microscopy.

In some embodiments of the CMM the emitter unit is arranged to the probe head with a fixed or an adjustable relative pose to the receiver unit. The probe head mounted on an actuator of the second set of actuators. The first set of actuators is configured to provide a relative lateral translation movement of the work piece to the probe head along two non-parallel lateral directions. The present disclosure is especially suitable to be utilized in combination of a 3-axis CMM, wherein the second set of actuators comprises the z-axis, while the first set of actuators comprises the x- and y-axes. The present disclosure might be equally applicable to an extended version of a 3-axis CMM, in particular a 5-axis CMM.

In some embodiments the first set of actuators is comprised by an articulated arm. It is clear for the person skilled in the art that the present disclosure is not limited to any specific design of a CMM. On the contrary the present disclosure might be realized by 3- or 5-axis CMMs, AACMMs or any other suitable designs. Furthermore the present disclosure might be realized as a software and/or hardware update for an existing CMM.

Some embodiments of the controller and the CMM are configured for the execution of the steps of the selected embodiment of the method.

The present disclosure further relates to a computer program product for the CMM which, when executed by a computing unit and/or a controller, causes the automatic execution of the steps of a selected embodiment of the distance adjustment method.

BRIEF DESCRIPTION OF THE DRAWINGS

By way of example only, specific embodiments will be described more fully hereinafter with reference to the accompanying figures, wherein.

DETAILED DESCRIPTION

Figure 1A:
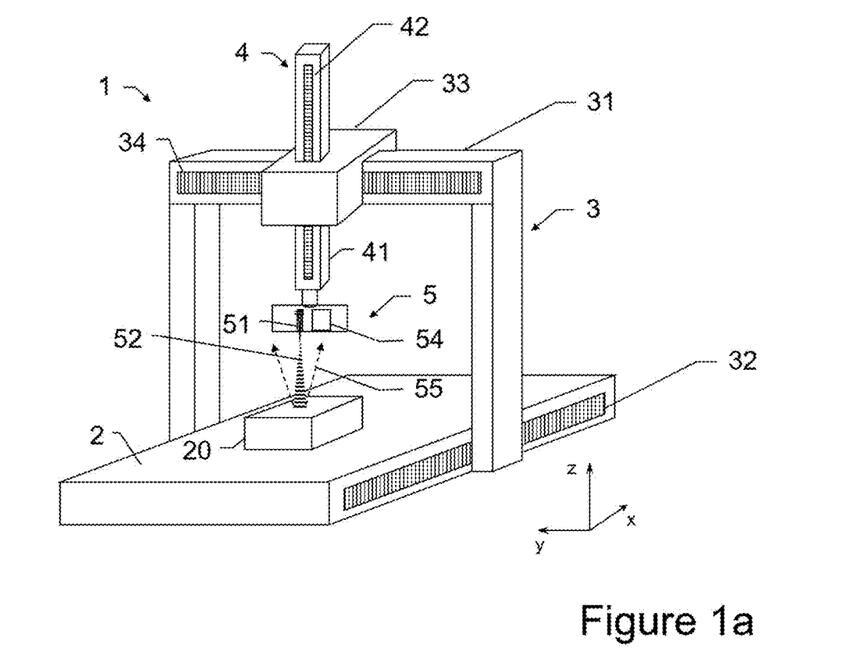
FIG. 1a shows a schematic embodiment of a three axis CMM.

FIG. 1a shows a schematic depiction of an embodiment of the CMM 1 as a three axis CMM. The CMM 1 comprises a measuring table 2 to support the work piece 20. While not shown, the measuring table 2 might comprise elements aiding the positioning of the work piece 20. The measuring table 2 might also comprise further elements to clamp or otherwise fix, in particular by a vacuum chuck, the work piece 20. Such further elements might be temporarily mounted to the measuring table 2. The first set of actuators 3 is embodied as movable frame mounted on the measuring table 2 such that it can be moved along a first axis, in the depicted embodiment the x-axis, by a first set of motors 32. The frame comprises an arm 31. The mounting of the probing system 33 is mounted on the arm 31 such that it can be moved along a second axis perpendicular to the first axis, in the depicted embodiment the y-axis, by a second set of motors 34. In the sense of the present disclosure the first set of actuators 3 comprise the respective motors 32, 34 and the mounting of the probing system 31, 33. It is also clear to the skilled person, that the in FIG. 1a depicted basic three axis setup might be extended with further components providing further degrees of freedom, in particular rotational degrees of freedom. Furthermore, the three axis setup serves solely illustrative purposes and the first set of actuators 3 must not be realized as the depicted movable frame but can be any suitable alternative form. It is also clear to the skilled person, that the first set of actuators 3 might comprise components physically not connected to each other. The specific features of alternative forms of the CMM 1, in particular the first set of actuators 3, might be applied accordingly.

In the FIG. 1a depicted setup the probe head 5 is mounted on a second arm 41 such that it can be moved along a third axis, which is perpendicular to the first and second axes, in the depicted embodiment the z-axis, by a third set of motors 42. The second arm 41 and the third set of motors 42 represent an embodiment of the second set of actuators, that is configured to execute distance adjustment steering commands to set the distance between the probe head 5 and the work piece 20. Alternative embodiments, wherein further components are installed between the arm 41 and the probe head 5 and the probe head 5 is mounted on these further components are also possible. Depending on the purpose of these further components, they might be comprised by the first set of actuators 3, the second set of actuators 4, both sets of actuators or none of those. Each of these embodiments are within the sense of the present disclosure.

The probe head 5 comprises an emitter unit 51 configured to emit a primary measuring beam 52, e.g. a laser beam, towards work piece 20. The primary measuring beam 52 provides a primary measuring beam pattern on the work piece 20. The interaction of the work piece 20 with the primary measuring beam 52 generates a secondary measuring beam 55 such that a secondary measuring beam pattern provides information representing a surface of the work piece 20. The probe head 5 comprises a receiver unit 54, e.g. a pixel detector, configured to acquire a secondary measuring beam pattern. The interaction might be a reflection of the primary measuring beam 52, in particular diffuse reflection. It is clear to the skilled person that the embodiment of the probe head 5 depicted in FIG. 1a, wherein the emitter 51 and receiver units 54 are integrated to a single component, is an illustrative embodiment. The present disclosure might also be realized by CMM 1 wherein the probe head 5 might comprise components physically not connected to each other, in particular wherein the emitter unit 51 and the receiver units 54 are physically separated.

Figure 1B:
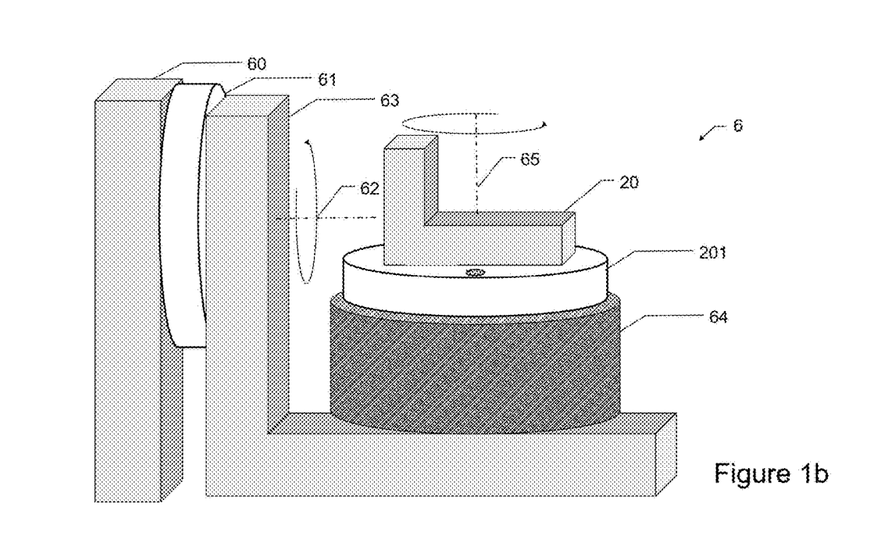
FIG. 1b depicts an embodiment of a two-axis rotary table for a three axis CMM.

FIG. 1b depicts an exemplary two-axis rotation stage 6 utilized, e.g. in combination with a three-axis CMM, to provide rotational degrees of freedom for the first set of actuators. The depicted rotation stage 6 comprises a first support element 60. The depicted first support element 60 is configured to be mounted on the measurement table, in particular by fastening means. A first motorized rotation table 61 providing a first rotational degree of freedom around the first rotation axis 62 is mounted on the first support element 60. The first rotation table 61 might be configured to provide a 360° rotation or a limited rocking motion. A second support element 63 is mounted on the first rotation table 61 and a second motorized rotation table 64 is mounted on the second support element 63. The second rotation table 64 provides a second rotational degree of freedom around the second rotation axis 65. The second rotation table 64 might be configured to provide a 360° rotation or a limited rocking motion. The second rotation axis 65 might be perpendicular to the first rotation axis 62. A specimen table 201 might be mounted on the second rotation table 64 to aid the positioning of the work piece 20. The specimen table 201 might also comprise further elements to clamp or otherwise fix, in particular by a vacuum chuck, the work piece 20. Alternative embodiments of a rotational stage 6 might also be applicable to advantageously utilize the disclosure. In particular the rotational stage 6 might be utilized to position the probe head instead of the work piece 20.

Figure 1C:
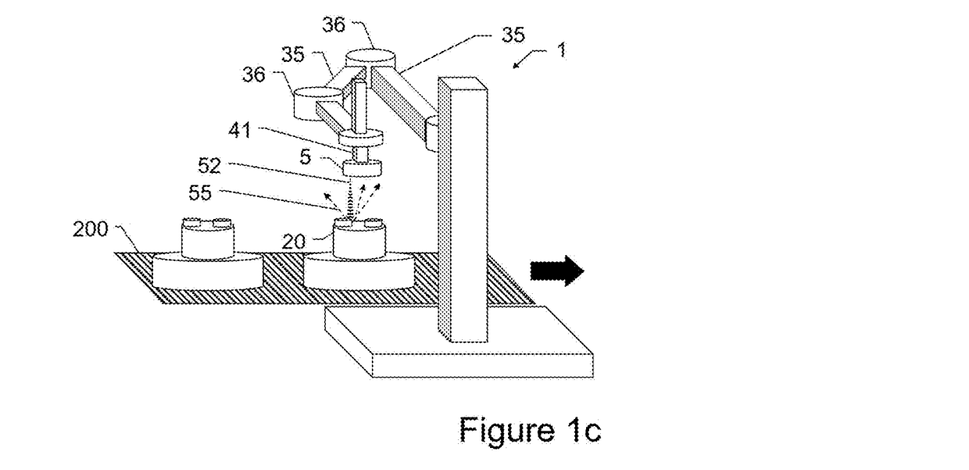
FIG. 1c shows a schematic embodiment of a CMM as an articulated arm inspection unit.

FIG. 1c depicts another typical embodiment of the CMM 1 as an articulated arm coordinate measuring/inspection unit. The depicted CMM 1 is placed next to a conveyor system 200, wherein the work pieces 20 are travelling towards the next station. The CMM 1 comprises arm segments 35 and joints 36, in particular motorized joints, to provide a lateral movement of the probe head 5 relative to the work piece 20. The joints 36 might provide further rotational degrees of freedom. The arm segments 35 joints 36 are essentially equivalent to the set of first actuators from the embodiment shown in FIG. 1a. In the embodiment shown in FIG. 1c the distance between the probe head 5 and the work piece 20 is set by a separate arm segment 41 configured to set the distance, i.e. essentially taking the role of the second set of actuators from the embodiment shown in FIG. 1a. The present disclosure is not limited to the depicted embodiment of the AACMM. On the contrary the present disclosure might be applicable to designs, wherein a coordinated movement of the arm segments 35 and joints 36 sets the distance between the probe head 5 and the work piece 20. The specific features of such embodiments might be applied accordingly.

The probe head 5 in the depicted embodiment is mounted on the distance adjustment arm segment 41. The emitter unit and the receiver unit are not shown in FIG. 1c, but substantially equivalent to the embodiment shown in FIG. 1a. The primary measuring beam 52 interacts with the surface of the work piece 20 and generates a secondary measuring beam as a result.

Figure 1D:
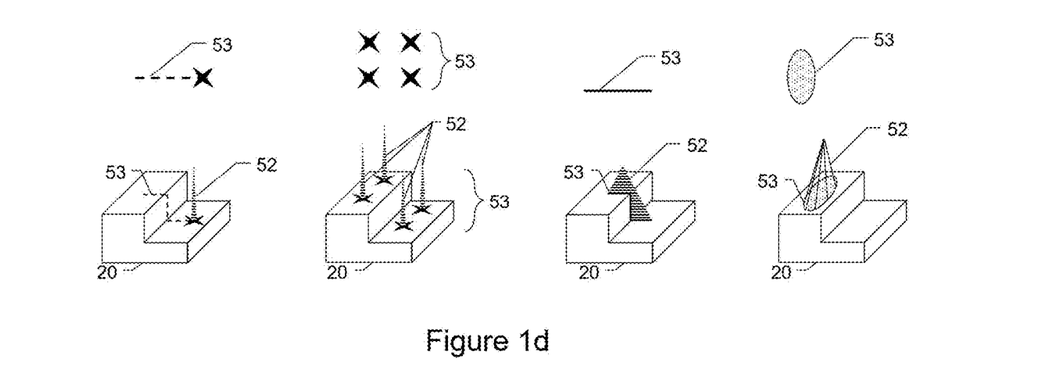
FIG. 1d shows some examples of the primary measuring beam pattern.

FIG. 1d on the top row shows some examples of the primary measuring beam pattern 53. The bottom row depicts the same primary measuring beam patterns 53 projected to a complex shaped work piece 20. The first column represents a class wherein a point like beam is scanned over the surface of the work piece 20. This embodiment illustrates a case wherein the primary measuring beam pattern 53 is not projected in a single step, but as a result of a rastering movement of the primary measuring beam 52. The second column shows an embodiment, wherein the primary measuring beam pattern 53 comprises a plurality of non-connected points. The third column shows an example wherein the primary measuring beam pattern 53 is an extended section projected in parallel by an extended primary measuring beam 52. The fourth column shows an embodiment wherein the primary measuring beam pattern 53 is an extended 2D plane figure. The embodiments depicted in FIG. 1d only serve an illustrative purpose. The features of the depicted embodiments, where reasonable might be combinable with each other. The present disclosure might also be applicable with any similar or alternative embodiment of the primary measuring beam pattern 53.

Figure 2:
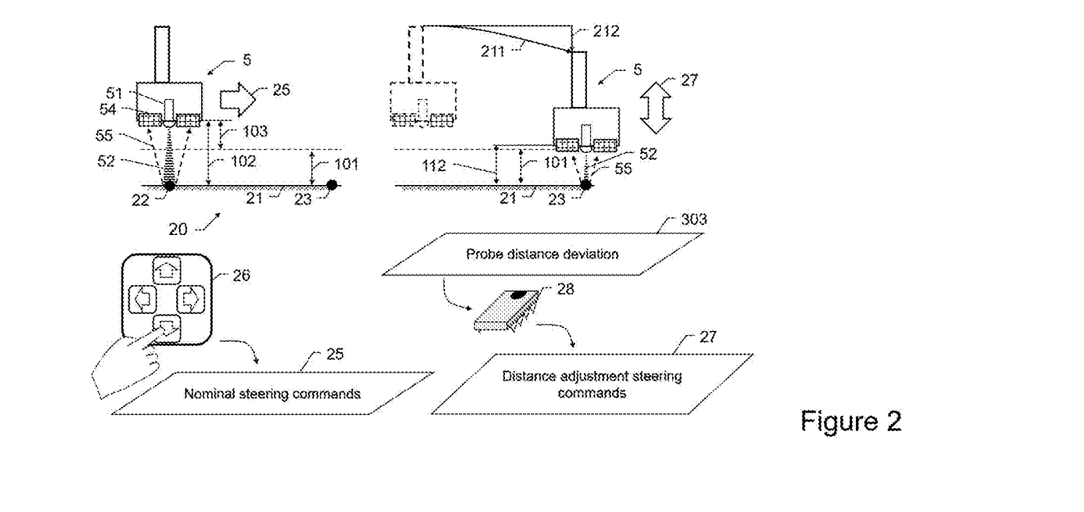
FIG. 2 depicts the schematics of a distance adjustments between a first and second measuring point.

FIG. 2 show a schematic measurement process. The probe head 5 is guided over a specimen 20 through a measuring path 21 based on the nominal steering commands 25. For transparency reasons only a 1D surface and measuring path is shown here. The features of extended surfaces and complex measuring paths 21 might be applied accordingly. In the depicted example the nominal steering commands 25 are based on operator input provided by e.g. a jogbox 26. The measuring path 21 comprises the first measuring position 22 and the second measuring position 23. In the first measuring position 22 the probe head 5 is set to a distance 102 from the work piece 20, which might not be known beforehand. The emitter unit 51 projects the primary measuring beam 52 to the work piece 20, and the receiver unit 54 acquires the secondary measuring beam 55. Based on the acquired secondary measuring beam pattern information regarding the distance 102 between the probe head 5 and the work piece 20 is derived. The first probe distance deviation 303 is derived based on the probe distance target data, representing the target distance 101 between the probe head 5 and the work piece 20, and the first probe distance information. The first probe distance deviation 303 might represent an actual deviation 103 of the target distance 101 and the distance 102 between the probe head 5 and the work piece 20.

The controller 28, depicted as a microcontroller, processes the probe distance deviation 303 and provides distance adjustment steering commands 27 to set the second distance 112 between the probe head 5 and the work piece 20 at the second measuring position 23. Two possible paths for the movement of the probe head 5 based on the nominal steering commands 25 and the distance adjustment steering commands 27 are depicted. The distance might be adjusted when the second measuring position has been reached 212 or might be adjusted continuously between the measuring positions 211. The second measuring step are carried out at the second measuring position 23 similarly to that of the first measuring position 22. The second distance 112 between the probe head 5 and the work piece 20 at the second measuring position 23 might also be derived. The further measuring steps might be executed in a similar fashion.

Alternatives to the here depicted embodiments exists. E.g. the controller 28 might be an external computer, the nominal steering commands 25 and the measuring path 21 might be automatically generated based on model data, the target distance 101 might be a range. All of such modifications lie within the sense of the present disclosure.

Figure 3:
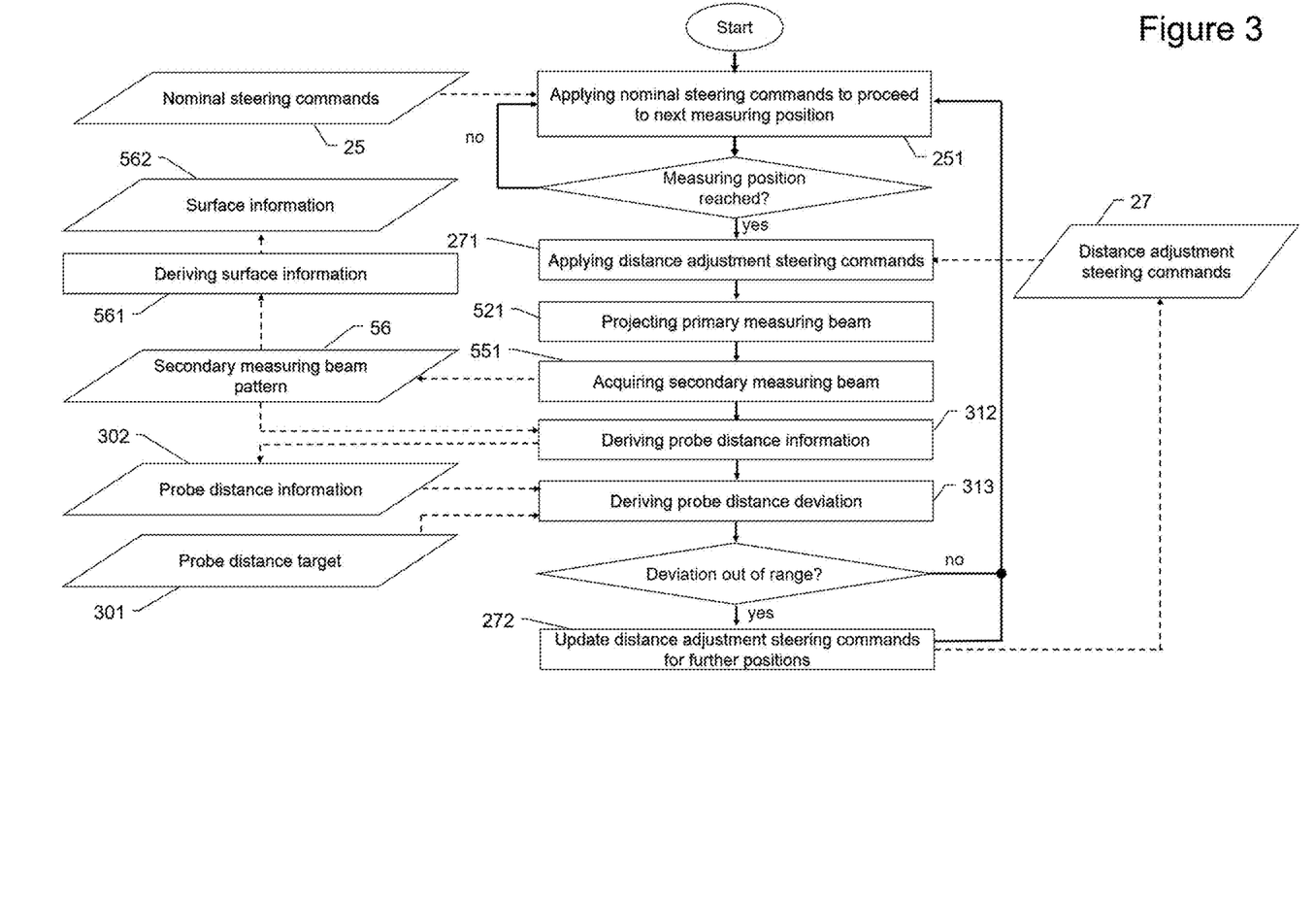
FIG. 3 depicts a flowchart of the distance adjustment method.

FIG. 3 depicts the schematics of an open loop scanning method during a measurement process. Flow lines/commands are depicted with bold lines while data lines are depicted with dashed lines. Some flowlines and/or data lines might not be shown in the schematic flowcharts for transparency reasons. The probe head is guided by applying 251 the nominal steering commands 25 along the measuring path. The nominal steering commands 25 might be based on manual commands from an operator, or might be partly or fully computer generated e.g. on the basis of a digital data of the work piece. In the depicted embodiment the probe head carried out measurements at discrete measuring positions, the specific features of continuous measurements might be applied accordingly. The distance of the probe head to the work piece is set by applying 271 the distance adjustment steering commands. The distance adjustment steering commands 27 are e.g. based on probe distance deviations from a previous measuring step. The measuring step further comprises projecting 521 the primary measuring beam and acquiring 551 the secondary measuring beam (only the data transfer depicted). The acquired secondary measuring beam pattern 56 is transferred to an algorithm deriving surface information 561. Deriving in the sense of the present information also means extending an existing piece of surface information with the information derived in the measuring step. The derived surface information 562 might comprise coordinate information, color information, surface quality information, surface composition information or any similar or alternative pieces of information.

The secondary measuring beam pattern 56 is also utilized for the distance adjustment loop. In the embodiment depicted in FIG. 3 the secondary measuring beam pattern 56 is directly utilized in deriving 312 the probe distance information 302. It is clear to the skilled person that the surface information 562 might also be used for deriving the probe distance information 302. The derived probe distance information 302 is compared with a probe distance target 301 in a step of deriving 313 the probe distance deviation. The probe distance target 301 and the probe distance information 302 might be the actual distances. The probe distance target 301 and the probe distance information 302 might be data regarding a part of the secondary measuring beam pattern 56. If the probe distance deviation exceeds a threshold the distance adjustment steering commands are updated 272. Said threshold might be set to zero, if an exact distance is to be kept. Said threshold might represent a range wherein adequate quality for the surface information 562 is expected. The updated distance adjustment steering commands 27 are utilized in a subsequent step. The distance adjustment steering commands 27 might be based on probe distance deviations from a plurality of measuring steps.

Figure 4:
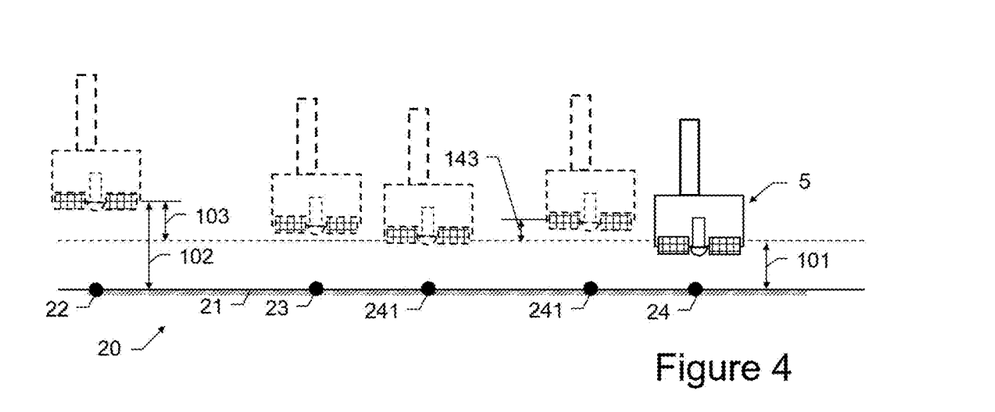
FIG. 4 depicts a measuring path comprising multiple measuring positions.

FIG. 4 depicts a measuring path 21 comprising the first 22, the second 23, the third 24 and two additional precedent measuring positions 241. For the sake of simplicity it is assumed that the target distance 101 between the probe head 5 and the work piece 20 is constant throughout the measurement process. While in many cases it is beneficial to keep the target distance 101 between the probe head 5 and the work piece 20 constant, the present disclosure is compatible with cases, where the target distance 101 is adjusted automatically or by the operator. The distance adjustment steering commands might be based on a single probe distance deviation 103, 143 from a single precedent measuring point, in particular the probe distance deviation 143 assessed at the immediately precedent measuring position. The present disclosure is, however, not limited to such cases. The distance adjustment steering commands might be based on the probe distance deviation derived at the first 22, and/or the second 23 and/or one or more precedent measuring positions 241. In some embodiments at least for some measuring positions the distance between the probe head 5 and the work piece 20 is not set and/or the probe distance deviation might not be derived.

Figure 5A:
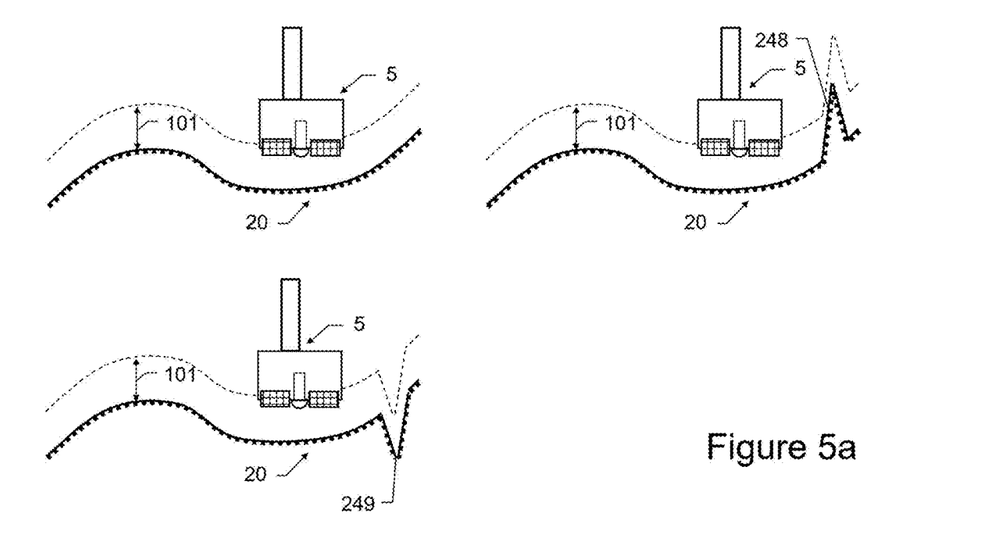
FIG. 5a depicts some examples of freeform surfaces.

The flat surface as shown in FIG. 4 represents the simplest work piece 20 to follow. FIG. 5a depicts some non-exclusive examples of more complex shapes for the work piece 20 such as freeform surface, a surface with a protruding obstacle 248 or with a hole 249 as an anomaly. Many alternatives of the here depicted structures exist. It is also self-evident that the surface might have a complex structure in the other dimension. The target distance 101 and the actual distance between the probe head 5 and the work piece 20 might be understood as depicted in FIG. 5a, i.e. a distance along a third axis of the CMM. The target distance 101 and the actual distance between the probe head 5 and the work piece 20 might also be understood with respect to the surface normal. The present disclosure is applicable with any reasonable interpretation of the distance between the probe head 5 and the work piece 20.

Figure 5B:
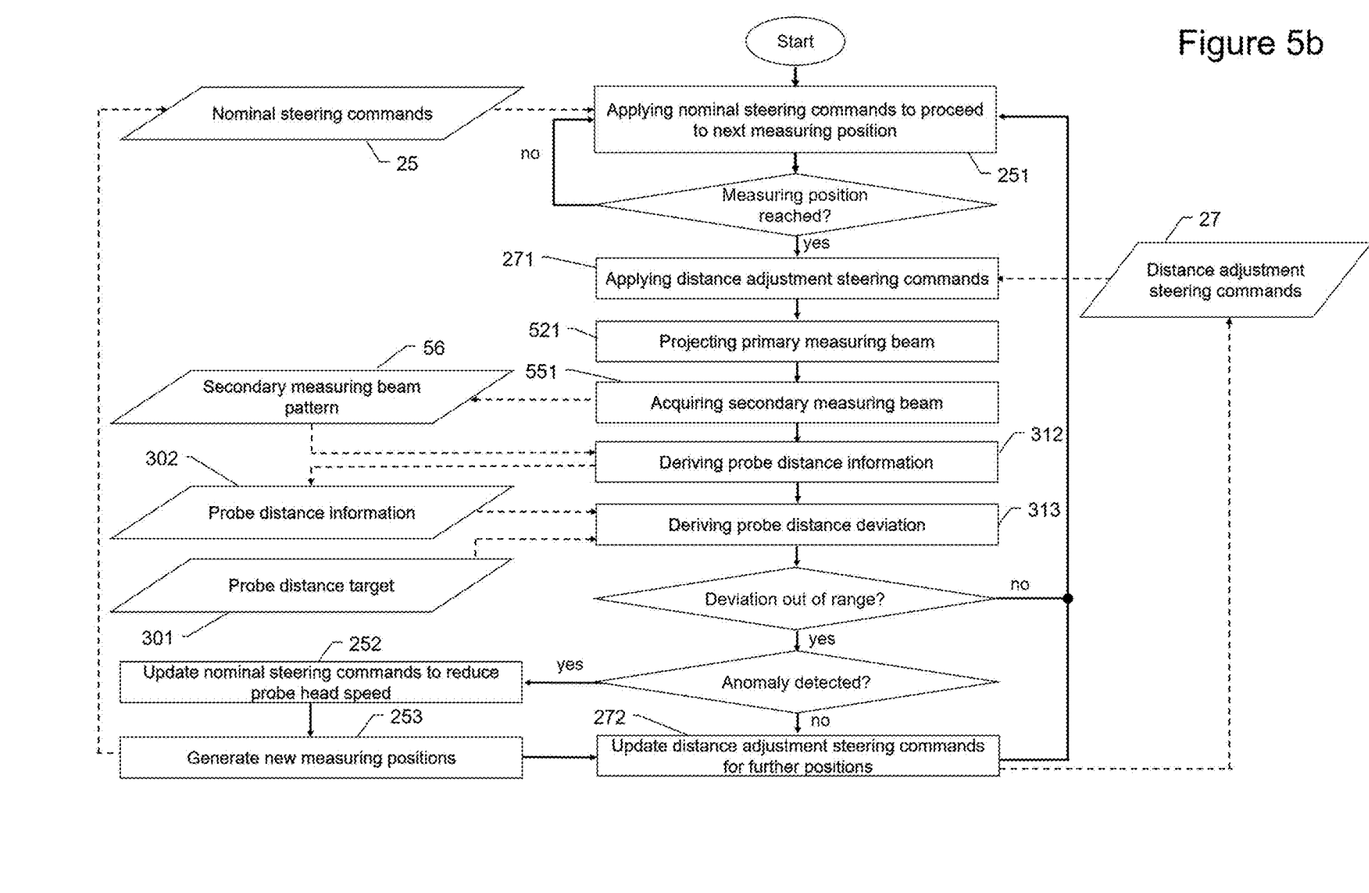
FIG. 5b shows a flowchart of an anomaly detection and the adjustment of the measuring path.

FIG. 5b depicts a flowchart on the process of anomaly detection. Anomalies might be defined on the basis of the probe distance deviation, in particular wherein the probe distance deviation change faster than a threshold. Anomalies might lead to a crash of the probe head, and thus an automatic action might be required to prevent a damage. Further types of anomalies might also be defined, in particular anomalies wherein the surface color or surface reflectivity show a difference, scratches or further structures on the surfaces, or a significant divergence from the design data. FIG. 5b depicts a process wherein the anomaly is detected on the basis of the probe distance deviation. The specific features of similar or alternative anomaly detection processes might be applied accordingly.

The anomaly detection process of FIG. 5b is realized within the measuring step as shown in FIG. 3. The transfer of the data to derive surface information is not shown in FIG. 5b. If the probe distance deviation is out of the range of the accepted levels, the probe distance deviation is further investigated. An anomaly on the work piece is detected based on one or more successive probe distance deviations, in particular wherein the one or more successive probe distance deviations exceeding a threshold level. After detecting an anomaly, the nominal steering commands 25 are updated 252 to reduce the probe head speed. The prime reason behind this step is to avoid or at least mitigate the consequences of a probe head crash. As a second effect the lower speed might allow a more detailed analysis of the region of interest. In order to achieve this new measuring positions are generated 253 along the measuring path.

Figure 6:
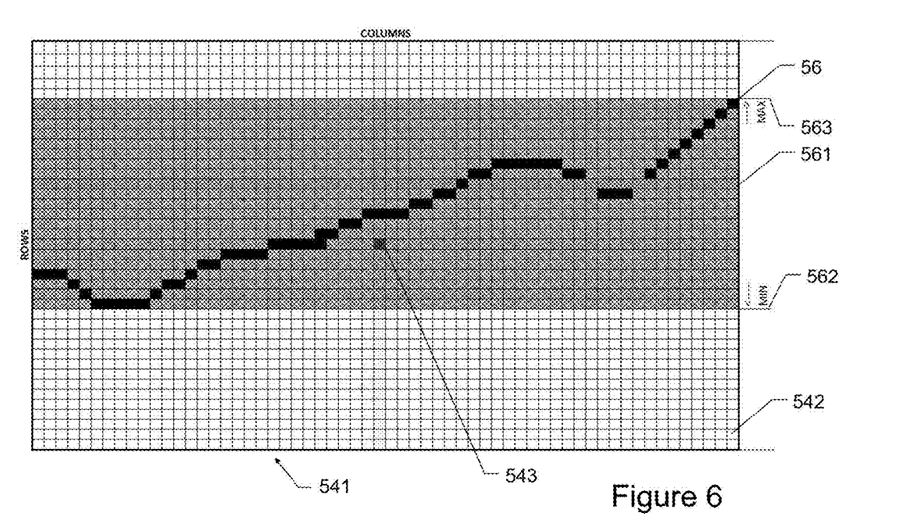
FIG. 6 depicts an acquired secondary measuring beam pattern from a laser triangulation measurement.

FIG. 6 depicts the schematics of a pixel detector 541 utilized for laser triangulation measurements. In the depicted example the pixels 542 are evaluated in a binary fashion, i.e. whether they detected the laser light above a threshold level. This simplified interpretation is beneficial for a fast derivation of the probe distance deviation. The secondary measuring beam pattern 56 correlates with the surface information, though a relationship between surface height and pixel positions is not necessarily linear. To provide information regarding the distance 102 between the probe head and the work piece the secondary measuring beam pattern 56 is evaluated in simplified manner. A non-exclusive list of evaluation possibilities are a.) the central pixel 543 represents probe distance target while the average pixel 561 of the secondary measuring beam 56 represents probe distance information, alternatively instead of the average the median pixel might be utilized b.) a maximum and/or minimum allowable pixel value is defined as the probe distance target, while the maximum 563 and/or minimum pixel 562 of the secondary measuring beam pattern 56 represent probe distance information, c.) the mean value of the maximum 563 and minimum pixel 562 value can also be defined as probe distance target.

Due to the fact that the pixel coordinates might not have a linear relationship to the real surface height the difference of the pixel coordinates does not necessarily translate to real-space differences. Therefore it is advantageous to derive an actual distance from the pixel coordinates. By utilizing e.g. the central pixel 543 or any other pre-defined target pixel as the probe distance target only a distance calibration regarding this pixel is needed. This distance calibration might be stored in a look up table.

Figure 7A:
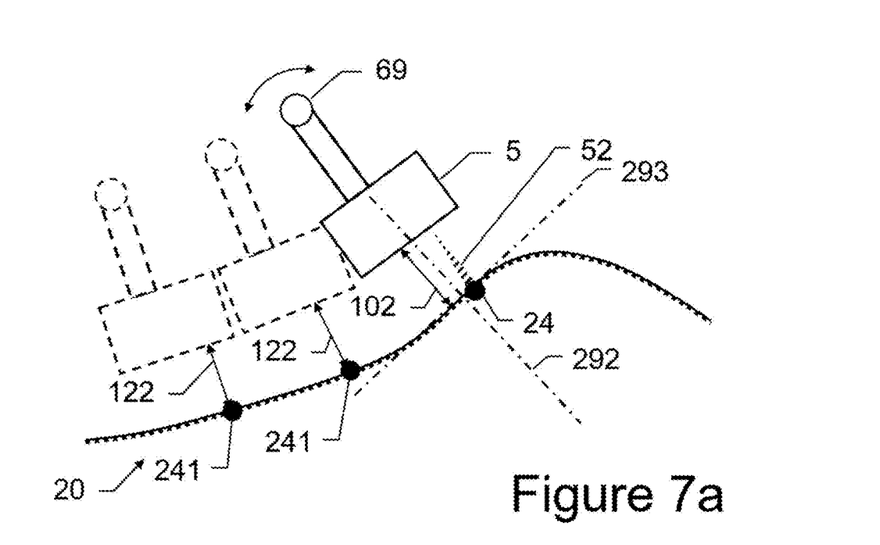
FIG. 7a depicts the alignment of the primary measuring beam to the work piece local surface normal.

FIG. 7a depicts a work piece 20 wherein the surface is not flat. The probe head 5 is mounted such that the first set of actuators (not shown) comprise elements 69 to provide a rotational degree of freedom. Instead of the probe head 5 the work piece might have also been mounted to provide the rotational degree of freedom. This setup allows a more accurate measurement, while not only the distance 102 between the probe head 5 and the work piece 20 could be kept in the acceptable range, but the primary measuring beam 52 might also be aligned to the local surface normal 292, respectively tangent plane 293, of the work piece 20 at the actual measuring position, depicted as a third measuring position 24. For clarity and transparency reasons the axis of the surface normal 292 and the arrow representing the distance 102 are depicted as shifted from third measuring position 24. For the person skilled in the art, it is clear that it is performed for the above purposes only. Contrary to that, depicting the primary measuring beam 52 as somewhat misaligned from the local surface normal 292 illustrates a core aspect of the disclosure. Namely, that both the distance adjustment steering commands and the beam rotation steering commands are derived on the basis of distances 122 between the probe head 5 and the work piece 20 obtained at a precedent measuring positions 241. The actual surface might show some variations in respect to the surface predicted on the basis of the precedent measuring positions 241.

Figure 7B:
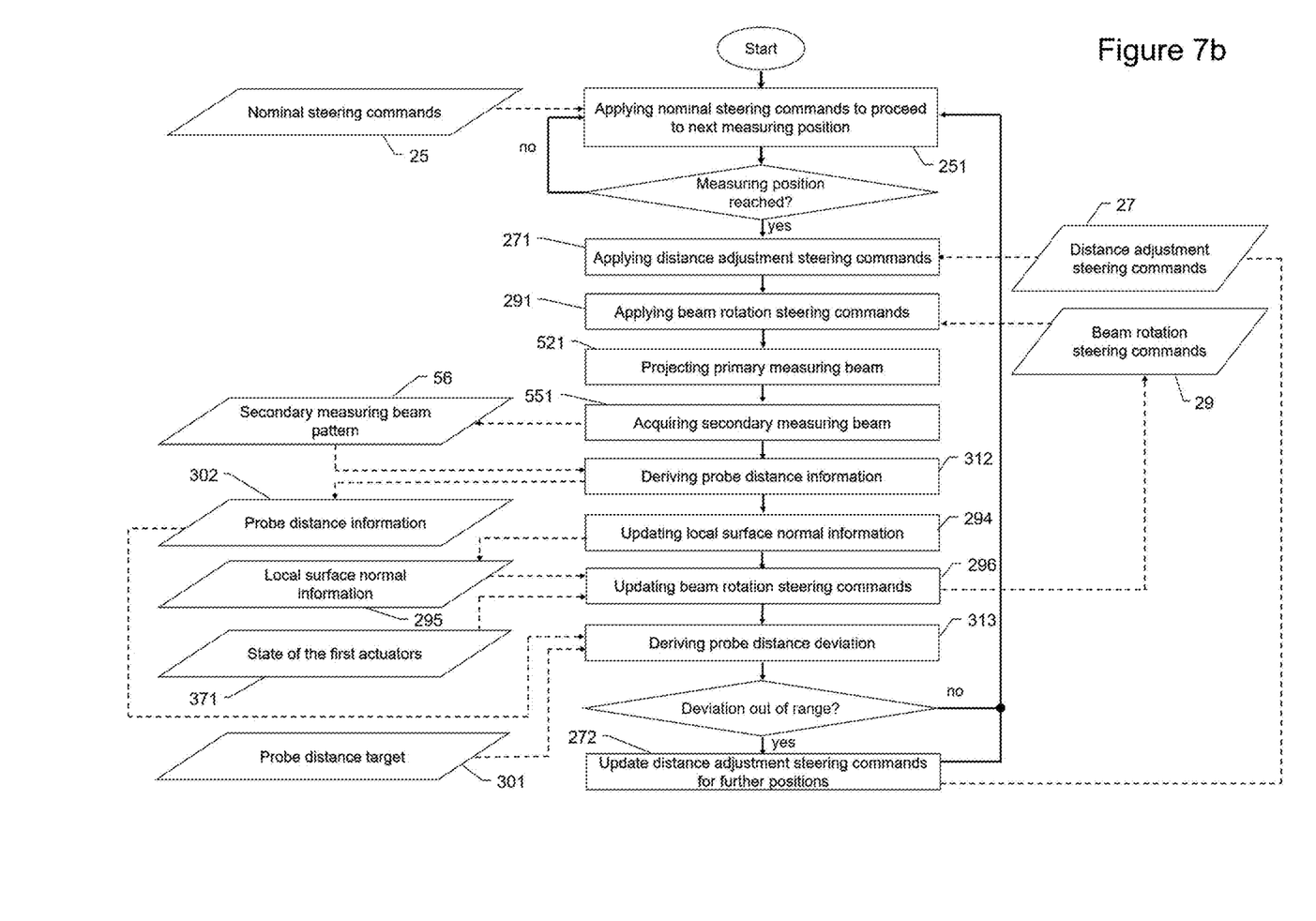
FIG. 7b depicts a flowchart of the alignment of the primary measuring beam to the work piece local surface normal.

FIG. 7b shows a flowchart on the process of adjusting the beam rotation. The measuring step further comprises the application 291 of the beam rotation steering commands 29. The beam rotation steering commands 29 are derived and/or updated 296 in further control loop based on the probe distance information 302 and the state of the first actuators 371 (data lines from the application 251 of nominal steering commands and application 291 of beam rotation steering commands are not shown). The beam rotation control loop might also process information regarding the state of the second actuators. First the local surface normal information is updated 294 based on the state of the first actuators 371 and the probe distance information 302. The beam rotation steering commands then updated 296 based on the local surface normal information 295.

It is clear for the person skilled in the art that the here presented flowcharts are just exemplary embodiments. The present disclosure might be realized through alternative means. In particular the different aspects presented in the separate flowcharts might be combinable with each other. It is also clear to the person skilled in the art that further control loops, in particular closed loops regarding a desired and actual position of an actuator might be processed with the here presented loops in parallel or sequentially.

Although aspects are illustrated above, partly with reference to some specific embodiments, it must be understood that numerous modifications and combinations of different features of the embodiments can be made. All of these modifications lie within the scope of the appended claims.

The invention claimed is:

1. A method for automatically controlling a distance between a non-contact measurement probe head of a coordinate measuring machine (CMM) and a work piece during a measurement process, the method comprising the steps of:
    providing nominal steering commands regarding a lateral movement of the probe head relative to the work piece, the nominal steering commands being configured to provide steering of the work piece and/or the probe head through a measuring path comprising a plurality of measuring positions,
    performing at a first measuring position a first measuring step comprising:
        providing first distance adjustment steering commands configured to provide setting of the distance between the probe head and the work piece,
        projecting a primary measuring beam pattern onto the work piece, wherein the primary measuring beam pattern providing a plurality of measurement points,
        acquiring a secondary measuring beam pattern, wherein the secondary measuring beam pattern originating from an interaction of the primary measuring beam with the work piece,
        deriving surface information based on the acquired secondary measuring beam pattern,
    wherein probe distance target data regarding a target distance between the probe head and the work piece being provided,
        the first measuring step further comprising:
            deriving first probe distance information regarding the distance between the probe head and the work piece based on the acquired secondary measuring beam pattern,
            deriving a first probe distance deviation based on the probe distance target data and the first probe distance information,
            providing the first probe distance deviation to be processed in a step of providing second distance adjustment steering commands for performing a second measuring step at a second measuring position.

2. The method according to claim 1, the method further comprising performing at the second measuring position, the second measuring step comprising:
    processing the first probe distance deviation,
    providing the second distance adjustment steering commands configured to provide setting of the distance between the probe head and the work piece, wherein the second distance adjustment steering commands being based on the first probe distance deviation,
    adjusting the distance between the probe head and the work piece based on the second distance adjustment steering commands,
    projecting the primary measuring beam pattern onto the work piece,
    acquiring the secondary measuring beam pattern,
    deriving surface information based on the acquired secondary measuring beam pattern.

3. The method according to claim 2, wherein the second measuring step further comprising:
    deriving second probe distance information based on the acquired secondary measuring beam pattern,
    deriving a second probe distance deviation based on the probe distance target data and the second probe distance information,
    providing the second probe distance deviation to be processed in a step of providing third distance adjustment steering commands for performing a third measuring step at a third measuring position.

4. The method according to claim 1, wherein the nominal steering commands being at least partly based on actual manual steering commands from an operator.

5. The method according to claim 1, wherein the nominal steering commands being automatically generated based on a predefined measuring path, wherein:
    a design data regarding the work piece being provided,
    the measuring path being generated with respect to the design data, and
    the distance adjustments steering commands being further based on the measuring path and the design data.

6. The method according to claim 5, wherein the design data being a coordinate information from a previous measurement process.

7. A controller for a CMM configured for the execution of the steps of the method according to claim 6.

8. A computer program product stored in a non-transitory computer readable medium, which, when executed by a computing unit and/or a controller, causes the automatic execution of the steps of the method according to claim 6.

9. A controller for a CMM configured for the execution of the steps of the method according to claim 1.

10. A computer program product stored in a non-transitory computer readable medium, which, when executed by a computing unit and/or a controller, causes the automatic execution of the steps of the method according to claim 1.

11. A controller for controlling a CMM, the CMM comprising a probe head:
wherein the probe head comprises:
an emitter unit configured to project a primary measuring beam pattern onto a work piece, wherein the primary measuring beam pattern providing a plurality of measurement points, and
a receiver unit configured to acquire a secondary measuring beam pattern, wherein the secondary measuring beam pattern originating from an interaction of the primary measuring beam with the work piece,
wherein the CMM further comprises
a first set of actuators configured to execute nominal steering commands regarding a lateral movement of the work piece relative to the probe head, the nominal steering commands being configured to provide steering of the work piece and/or the probe head through a measuring path comprising a plurality of measuring positions,
a second set of actuators configured to execute distance adjustment steering commands to set the distance between the probe head and the work piece,
the controller comprising an evaluation functionality configured to derive surface information based on the acquired secondary measuring beam pattern,
wherein the controller is configured to:
provide probe distance target data regarding a target distance between the probe head and the work piece,
derive first probe distance information regarding the distance between the probe head and the work piece based on the acquired secondary measuring beam pattern,
derive a first probe distance deviation based on the probe distance target data and the first probe distance information, and
provide the first probe distance deviation to be processed in a step of providing second distance adjustment steering commands for performing a second measuring step at a second measuring position.

12. The controller for the CMM according to claim 11, wherein:
the first set of actuators being further configured to provide a rotational degree of freedom,
the controller being further configured to derive a work piece local surface normal based on a plurality of preceding probe distance information,
the controller being further configured to provide beam rotation steering commands for the first actuators based on the work piece local surface normal, wherein the beam rotation steering commands being configured to provide aligning of the primary measuring beam to the work piece local surface normal at a subsequent measuring position.

13. The controller for the CMM according to claim 11, wherein the controller further comprising an anomaly detection functionality configured for
detecting an anomaly on the work piece based on one or more successive probe distance deviations, and
updating the nominal steering commands based on the detected anomaly in order to reduce a lateral movement velocity of the probe head.

14. The controller for the CMM according to claim 13, wherein the controller being further configured to automatically update the measuring path by generating further measuring positions along the measuring path in order to derive more surface information based on the detected anomaly.

15. A CMM comprising a controller, the CMM comprising:
a probe head having:
an emitter unit configured to project a primary measuring beam pattern onto a work piece, wherein the primary measuring beam pattern providing a plurality of measurement points,
a receiver unit configured to acquire a secondary measuring beam pattern, wherein the secondary measuring beam pattern originating from an interaction of the primary measuring beam with the work piece,
a first set of actuators configured to execute nominal steering commands regarding a lateral movement of the work piece relative to the probe head, the nominal steering commands being configured to provide steering of the work piece and/or the probe head through a measuring path comprising a plurality of measuring positions,
a second set of actuators configured to execute distance adjustment steering commands to set the distance between the probe head and the work piece,
wherein the controller is configured to:
provide probe distance target data regarding a target distance between the probe head and the work piece,
derive first probe distance information regarding the distance between the probe head and the work piece based on the acquired secondary measuring beam pattern,
derive a first probe distance deviation based on the probe distance target data and the first probe distance information, and
provide the first probe distance deviation to be processed in a step of providing second distance adjustment steering commands for performing a second measuring step at a second measuring position.

16. The CMM according to claim 15, wherein:
the primary measuring beam being a laser beam,
the interaction of the primary measuring beam with the work piece being a reflection of the laser beam, and the secondary measuring beam pattern being a reflected laser beam pattern,
utilizing a laser triangulation method to derive coordinate information.

17. The CMM according to claim 15, wherein:
the emitter unit being arranged to the probe head with a fixed or an adjustable relative pose to the receiver unit,
the probe head being mounted on an actuator of the second set of actuators,
the first set of actuators being configured to provide a relative lateral translation movement of the work piece to the probe head along two non-parallel lateral directions.

* * * * *